No. 747,888. PATENTED DEC. 22, 1903.
J. L. LAWRENCE.
VEHICLE WINDOW MECHANISM FOR CANOPY TOPS.
APPLICATION FILED OCT. 12, 1903.
NO MODEL.
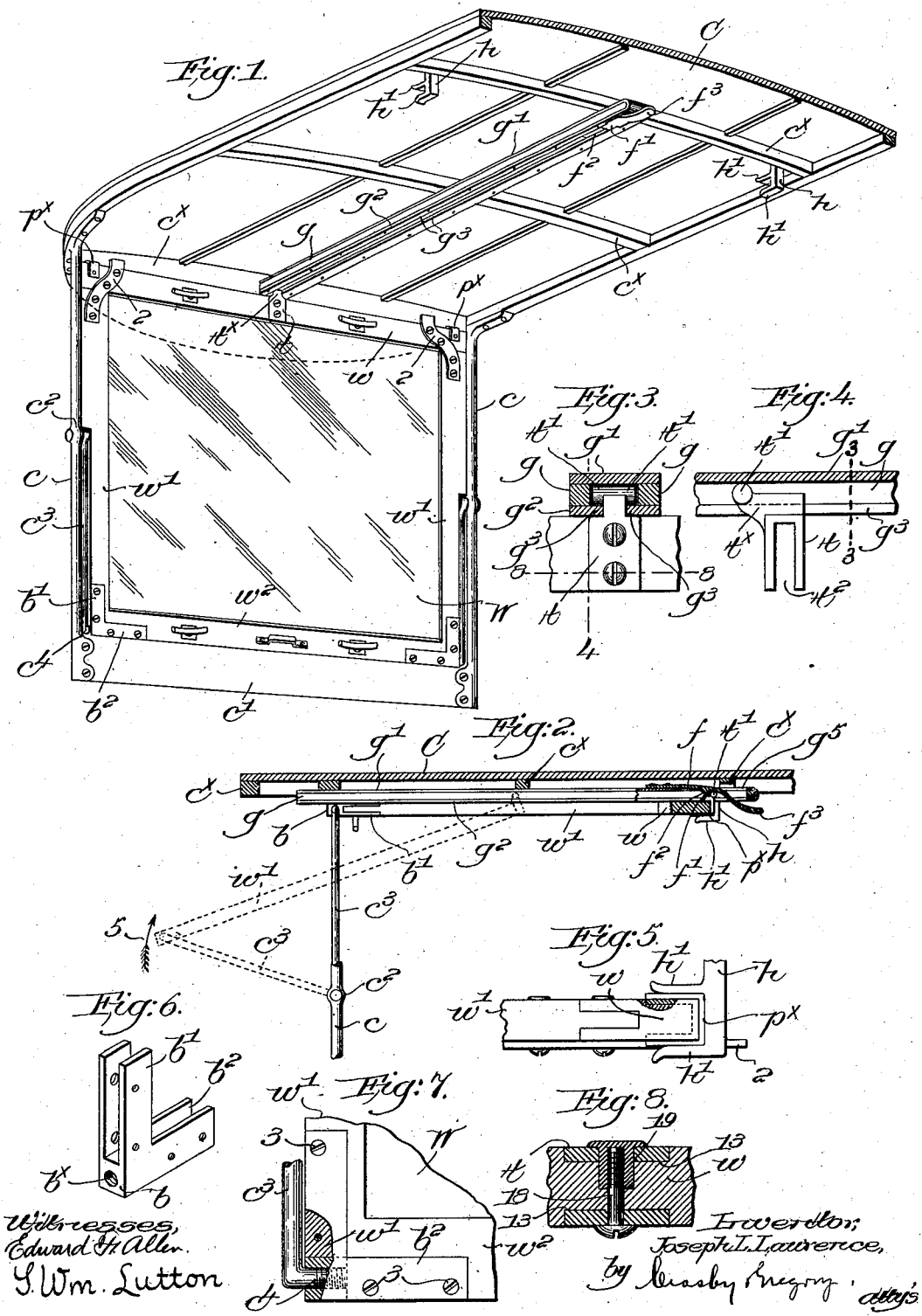

No. 747,888. Patented December 22, 1903.

UNITED STATES PATENT OFFICE.

JOSEPH L. LAWRENCE, OF BROOKLINE, MASSACHUSETTS, ASSIGNOR OF ONE-HALF TO CHAUNCEY THOMAS & COMPANY, OF BOSTON, MASSACHUSETTS, A CORPORATION OF MAINE.

VEHICLE-WINDOW MECHANISM FOR CANOPY-TOPS.

SPECIFICATION forming part of Letters Patent No. 747,888, dated December 22, 1903.

Application filed October 12, 1903. Serial No. 176,611. (No model.)

*To all whom it may concern:*

Be it known that I, JOSEPH L. LAWRENCE, a subject of the King of Great Britain, and a resident of Brookline, county of Norfolk, State of Massachusetts, have invented an Improvement in Front-Window Mechanism for Vehicle Canopy-Tops, of which the following description, in connection with the accompanying drawings, is a specification, like numerals on the drawings representing like parts.

This invention relates to the mechanism for controlling and operating the front windows of vehicles having canopy-tops, and more particularly to automobile vehicles provided therewith.

The extended use of automobiles for touring purposes has demanded some form of superstructure by which the occupants may be shielded from the sun and inclement weather, and the canopy-top has been utilized for such purpose, the sides and back being inclosed by curtains when necessary. It is manifest that a clear outlook ahead must be provided for at all times, and a glass window is utilized to close the front of the superstructure. Such a window must be readily movable out of the way when not needed and readily accessible to be shut when desired, and owing to the constant vibration to which an automobile is subjected it will be manifest that special means must be employed both for supporting and guiding the movement of the window and for retaining it securely in open position and out of the way.

My present invention has for its object the production of novel and efficient means for supporting and guiding the front window of a vehicle superstructure of the character specified, means being provided for locking it securely when in open position and for supporting it from vibration and twisting when in such position.

The various novel features of my invention will be fully described in the subjoined specification and particularly pointed out in the following claims.

Figure 1 is a perspective view of the under side of a vehicle canopy-top and the front window closed with one embodiment of my invention applied thereto. Fig. 2 is a side elevation and partial section thereof, showing in full lines the window in raised open position, the retaining or locking means being shown in section. Fig. 3 is an enlarged detail in front elevation of the traversing connection or traveler between the top of the window and its overhead guide, the latter being in section on the line 3 3, Fig. 4. Fig. 4 is a sectional detail, also enlarged, on the line 4 4, Fig. 3, looking toward the right, and with the top bar of the window-sash omitted. Fig. 5 is a side elevation, enlarged, of one form of support for the top of the window when the latter is raised and open. Fig. 6 is a perspective view of one of the socket corner-pieces for the lower corner of the sash. Fig. 7 is a front elevation of one of the lower corners of the window and corner-piece, the latter being broken out to show the sash; and Fig. 8 is an enlarged sectional detail, showing the mode of securing the traveler to the window-top, taken on the line 8, Fig. 3.

Referring to Fig. 1, the canopy-top C, having transverse strengthening-braces $c^\times$ and the rigidly-attached depending frame for the front window, said frame comprising rigid upright side bars $c$ and a bottom cross-bar $c'$, may be and are all of usual construction, the side bars having bearings $c^2$ for the fulcrum ends of radius-bars or swinging side supporting-arms $c^3$, to be referred to. On its under side the canopy-top has rigidly secured to it a central longitudinal guide extended rearwardly from the front end thereof, said guide being herein shown as composed of two parallel and separated bars $g$, having secured to their upper and lower faces a metallic strap $g'$ $g^2$, bent into an elongated U shape, the lower run $g^2$ of the strap being slotted centrally to leave parallel lips $g^3$ projecting toward each other beyond the bars $g$. (See Fig. 3.) Two opposed grooves or tracks are thus provided for the reception of oppositely-projecting lugs $t'$ on the forwardly-extended head $t^\times$ of a traveler or traversing connection $t$, the lugs being herein shown as cylindrical, Fig. 4, in order that they may rock as well as slide longitudinally in the guide described. As shown in Figs. 3 and 4, the main portion or body of the traveler moves below the guide, while its head $t^\times$ travels between the lips $g^3$. The traveler is bifurcated or forked at $t^2$, Fig. 4, to straddle the top member $w$ of the front-window sash, said member $w$ being suitably recessed for the purpose, and suitable fastenings, to be referred to, rigidly secure the traveler thereto, it forming a sliding connection between the front window and the overhead guide. Suitable straps 2 connect the top $w$ and the sides $w'$ of the sash, the upper ends of the straps being shown in Fig. 1 as extending above the top of the sash to engage the front brace $c^\times$ of the canopy-top when the window is closed and serving as stops therefor. Usually the top member $w$ of the sash is made readily detachable, so that a new window-glass W may be inserted in case of breakage, the side members $w'$ being grooved to receive it; but said side members and the bottom member $w^2$ are rigidly and permanently connected by corner pieces or braces. (Shown separately in Fig. 6.) Each corner-piece is substantially L-shaped, having bifurcated arms $b'$ $b^2$ to embrace the suitably-recessed members $w'$ $w^2$, respectively, the corner or body $b$ being solid metal and having a socket $b^\times$ therein. Screws 3 secure the corner-piece rigidly to the sash, and the inturned ends $c^4$ of the swinging supporting-arms $c^3$ are pivotally inserted in the sockets $b^\times$, so that the lower corners of the window are pivotally connected with said arms.

When the window is to be opened, its lower end is pushed forward, and the arms swing forward and upward, (see arrow 5, Fig. 2,) turning in the bearings $c^2$, which are central between the top and bottom of the window, and as the top of the window swings in the traveler slides rearwardly on the overhead guide. The side arms $c^3$ thus support the window at its lower corners and sides and control the movement thereof, while the traveler and guide sustain and guide the top of the window at the middle thereof, and when the arms are swung upright, as in Fig. 2, the window is then immediately beneath the guide and in open raised position. At such time it is necessary to maintain the window securely raised until it is desired to shut it, and I have provided automatically-acting means to operate instantly when the window is fully opened—that is, in the position shown in Fig. 2.

Referring to Figs. 1 and 2, the upper part $g'$ of the U-shaped strap is slotted longitudinally, as at $g^5$, Fig. 2, near its rear end, and a spring-catch $f$ is secured to the part $g'$ within the slot, said catch having a downturned locking-shoulder $f'$, a beveled under face $f^2$, and a finger-piece $f^3$. The catch normally occupies the position shown in Fig. 2, with the shoulder $f'$ between the two opposed grooves of the guide, the beveled face $f^2$ being toward the front end of the guide, while the finger-piece extends below said guide. When the window is swung upward and rearward, as has been described, the traveler-head in its rearward movement engages the face $f^2$ and lifts the catch, so that the head can pass the shoulder $f'$. Immediately thereafter the resiliency of the catch snaps it down into locking position, (see Fig. 2,) with the shoulder in engagement with the traveler-head, and the window is thereby locked automatically in open raised position. So long as the catch is undisturbed the window will be maintained locked in substantially horizontal position beneath the canopy-top. When the window is to be shut, the operator pushes up on the finger-piece $f^3$, thereby lifting the shoulder $f'$ from the path of the traveler-head $t^\times$.

In a large automobile the front window is heavy plate-glass several feet wide and high, and the sash is made heavy and strong to securely hold the glass, making the combined sash and glass of considerable weight. On this account I have found it highly desirable to provide means for vertically supporting the window near its upper corners when said window is open or raised, so that there can be no vibrational or twisting strains imparted thereto by the motion of the vehicle. Herein I have shown one efficient form of such supporting means and will now describe the same.

On one of the cross-braces $c^\times$ of the canopy-top I rigidly secure like supports or clips $h$, each presenting fixed open jaws $h'$, slightly flared at their outer ends and extended toward the front of the vehicle, the supports or clips being located at opposite sides of the overhead central guide and so located that when the window is raised and slid rearward the jaws will engage the window-top $w$ adjacent the corners. Herein I have shown the supports $h$ so located that they engage the window-top just outside the corner-straps 2, and in Figs. 2 and 5 the window is shown engaged by the supports and sustained vertically thereby. So far as vertical support is concerned the supports or clips $h$ act entirely independently of the traveler and guide, and any twisting or vibrational movement of the window is obviated.

In order to prevent rattling of the window when raised, I prefer to apply leather or other suitable pads $p^\times$ to the window-top to enter snugly between the jaws $h'$.

An enlarged sectional detail is shown in Fig. 8 of the means for fastening the traveler to the member $w$ of the window-sash. The latter is cut away at front and back, as at 13, to receive the body $t$ of the traveler, the bifurcated part $t^2$ straddling the member $w$, and through one leg of the traveler a screw-stud 18 is inserted, passing through a hole bored in the member $w$. An interiorly-threaded thimble 19 is inserted through the opposite leg into the wood, and the stud 18 is screwed lightly thereinto.

I have herein described and shown in detail one practical embodiment of my invention; but the same may be changed or modified in various details by those skilled in the art without departing from the spirit and scope of my invention.

Having described my invention, what I claim, and desire to secure by Letters Patent, is—

1. A canopy-top for vehicles, a longitudinal overhead guide centrally mounted thereon, a front window, a traversing connection between the top thereof and the guide, swinging side supports for and pivotally connected with the lower corners of the window, and means to automatically engage said connection and maintain the window in raised, open position.

2. A canopy-top for vehicles, a longitudinal overhead guide centrally mounted thereon, a front window, a pivotal connection between the top thereof and the guide and longitudinally movable along the latter, swinging side supporting-arms pivotally connected with the lower corners of the window, and means at the rear end of the guide to automatically engage said connection and maintain the window in raised, open position.

3. A canopy-top for vehicles, a longitudinal overhead guide centrally mounted thereon, a front window, a traveler rigidly connected with the top of the window and adapted to rock and also slide longitudinally upon the guide, a spring-catch at the rear end of the guide to engage said traveler when the window is swung upward and rearward, and swinging side supporting-arms pivotally connected with the lower corners of the window.

4. A canopy-top for vehicles, a longitudinal overhead guide centrally mounted thereon, a front window, a traversing connection between the top thereof and the guide, swinging side supports for and pivotally connected with the lower corners of the window, means to automatically engage said connection and maintain the window in raised, open position, and means on the canopy-top to engage and support the top of the raised window at opposite sides of the guide.

5. A canopy-top for vehicles, a longitudinal overhead guide centrally mounted thereon, a front window, a traversing connection between the top thereof and the guide, swinging side supports for and pivotally connected with the lower corners of the window, automatically-acting means to maintain the window in raised, open position, and clips on the canopy-top at opposite sides of the guide to receive the top of and support the window when raised.

6. A canopy-top for vehicles, a longitudinal overhead guide centrally mounted thereon and having opposed grooves, a front window, a traveler rigidly attached to its top and having a T-shaped head to enter and slide in the grooves of the guide, swinging supporting-arms at the sides and pivotally connected with the lower corners of the window, a spring-catch at the rear end of the guide, to automatically engage the traveler when the window is raised, and supports fixedly mounted on the canopy-top at opposite sides of the guide, to receive the top of and sustain the window when raised.

7. A canopy-top for vehicles, a longitudinal overhead guide centrally mounted thereon, a front window, swinging arms pivotally connected with and to support and guide the window at its opposite lower corners when swung upward and rearward beneath the canopy-top, a sliding connection between the center of the window-top and the guide, means to sustain the top of the window, when raised, independently of said connection, and an automatic catch to lock the window in raised position.

8. A canopy-top for vehicles, a longitudinal overhead guide centrally mounted thereon, a front window, a traveler rigidly attached to the top of the window at its top and adapted to rock and also slide longitudinally upon the guide, socketed corner-pieces for the lower corners of the window, swinging supporting-arms having their free ends inturned to enter the sockets of the corner-pieces, fixed clips on the canopy-top at opposite sides of the guide, to receive and vertically support the top of the window near its upper corners when the window is raised, pads on the window-top to enter the clips and prevent rattling, and a spring-catch to automatically engage the traveler when the window is raised and maintain it in such position.

9. A canopy-top for vehicles, a longitudinal overhead guide centrally mounted thereon and having opposed grooves, a front window, a traveler rigidly attached to its top and having a forward extension provided with lateral pivot-lugs to enter the guide-grooves and rock and slide therein, swinging means to support and guide the lower corners of the window, a catch to automatically engage and hold the traveler when the window is in raised, open position, and supports to sustain the top of the raised window near its opposite sides independently of the traveler and guide.

In testimony whereof I have signed my name to this specification in the presence of two subscribing witnessses.

JOSEPH L. LAWRENCE.

Witnesses:
JOHN C. EDWARDS,
ELIZABETH R. MORRISON.